United States Patent
Avenido et al.

(10) Patent No.: US 11,656,236 B2
(45) Date of Patent: May 23, 2023

(54) MIRROR CALIBRATION OF MULTIPLE FLOW-MEASUREMENT DEVICES

(71) Applicant: TSI Incorporated, Shoreview, MN (US)

(72) Inventors: Aaron Serafin Avenido, Minneapolis, MN (US); Russell R. Graze, Dunlap, IL (US); Jason Paul Johnson, Saint Paul, MN (US); Robert C. Anderson, Glenmont, NY (US)

(73) Assignee: TSI Incorporated, Shoreview, MN (US)

( * ) Notice: Subject to any disclaimer, the term of this patent is extended or adjusted under 35 U.S.C. 154(b) by 0 days.

(21) Appl. No.: 17/765,239

(22) PCT Filed: Dec. 31, 2019

(86) PCT No.: PCT/US2019/069085
§ 371 (c)(1),
(2) Date: Mar. 30, 2022

(87) PCT Pub. No.: WO2021/066868
PCT Pub. Date: Apr. 8, 2021

(65) Prior Publication Data
US 2022/0283072 A1    Sep. 8, 2022

Related U.S. Application Data

(60) Provisional application No. 62/907,886, filed on Sep. 30, 2019.

(51) Int. Cl.
*G01N 35/00*        (2006.01)
*G01N 1/38*         (2006.01)
(Continued)

(52) U.S. Cl.
CPC ..... *G01N 35/00693* (2013.01); *G01N 1/2035* (2013.01); *G01N 1/38* (2013.01);
(Continued)

(58) Field of Classification Search
CPC .. G01N 35/00693; G01N 1/2035; G01N 1/38; G01N 1/2252; G01N 15/1012; G01N 2001/2255; G01N 15/0205
See application file for complete search history.

(56) References Cited

U.S. PATENT DOCUMENTS

2002/0166390 A1* 11/2002 Graze, Jr. ............... G01N 1/38
                                                          73/863.61
2004/0200265 A1  10/2004  Eden et al.
2016/0363571 A1  12/2016  Purushothaman

FOREIGN PATENT DOCUMENTS

CN      106645587 A    5/2017
WO   WO-2018053165 A1 *  3/2018  ............ G01N 1/38
(Continued)

OTHER PUBLICATIONS

"International Application Serial No. PCT/US2019/069085, International Preliminary Report on Patentability dated Jan. 7, 2022", 5 pgs.
(Continued)

*Primary Examiner* — David Z Huang
(74) *Attorney, Agent, or Firm* — Schwegman Lundberg & Woessner, P.A.

(57) ABSTRACT

Various embodiments include an exemplary apparatus and method for insitu calibration of multiple flow-sensing devices within a dilution system. In one example, a calibration and dilution system includes a first mass-flow device to serve as a global reference, a second mass-flow device configured to be coupled to and provide a supply of clean gas to a primary diluter, and a third mass-flow device configured to be coupled to and provide a supply of clean
(Continued)

gas to a secondary diluter, where the diluters are pneumatically coupled to one another through a gas-supply line. Multiple valves are coupled to at least the mass-flow devices and the diluters. The calibration and dilution system is arranged so that the mass-flow controllers can be calibrated in-situ without having to remove any of the mass-flow controllers from the calibration and dilution system. Other apparatuses, designs, and methods are disclosed.

20 Claims, 10 Drawing Sheets

(51) Int. Cl.
*G01N 1/20* (2006.01)
*G01N 1/22* (2006.01)
*G01N 15/10* (2006.01)
*G01N 15/14* (2006.01)

(52) U.S. Cl.
CPC ....... *G01N 1/2252* (2013.01); *G01N 15/1012* (2013.01); *G01N 2001/2255* (2013.01); *G01N 2015/1486* (2013.01); *G01N 2015/1493* (2013.01)

(56) References Cited

FOREIGN PATENT DOCUMENTS

WO  WO-2018194986 A2  10/2018
WO  WO-2021066868 A1  4/2021

OTHER PUBLICATIONS

"International Application Serial No. PCT/US2019/069085, International Search Report dated Jun. 29, 2020", 3 pgs.
"International Application Serial No. PCT/US2019/069085, Written Opinion dated Jun. 29, 2020", 5 pgs.

* cited by examiner

MIRROR CALIBRATION OF MULTIPLE FLOW-MEASUREMENT DEVICES

CLAIM OF PRIORITY

This application is a U.S. National-Stage Filing under 35 U.S.C. § 371 from International Application No. PCT/US2019/069085, filed 31 Dec. 2019, which claims the priority benefit to U.S. Patent Application Ser. No. 62/907,886, filed on 30 Sep. 2019, and entitled "MIRROR CALIBRATION OF MULTIPLE FLOW-MEASUREMENT DEVICES," the disclosures of which are incorporated by reference herein in their entireties.

TECHNOLOGY FIELD

The disclosed subject matter is generally related to the field of counting particles from high-concentration emission sources. More specifically, the disclosed subject matter is related to in-situ calibration of mass-flow controllers in a particle-dilution system.

BACKGROUND

Most particle-measurement instruments, especially particle-measurement instruments used for analyzing particle sizes and concentrations of engine-exhaust systems, require sample dilution to reduce the particle-number concentration to a level that is measurable. Such particle-measurement instruments typically benefit from the samples from engine-exhaust systems being cooled (e.g., at approximately ambient temperature) and dried (e.g., substantially at ambient relative humidity or dryer). Contemporaneous dilution systems are optimized for high dilution-factors. A dilution factor necessary to reduce particle-number concentrations has historically exceeded the dilution factor necessary to cool the sample and prevent water condensation. Advances in engine and after-treatment technology (e.g., gasoline particulate-filters (GPF) and diesel particulate filters (DPF) are emission after-treatment technologies developed to control particulate emissions) and their associated reductions in particle concentrations of exhausts have also created a need for a dilution method optimized for low dilution factors.

One manufacturer of particle instrumentation, TSI® Incorporated (located at 500 Cardigan Road, Shoreview, Minn. 55126 USA) has developed a Model 3098 Porous Tube Thermodiluter (PTT). The 3098 PTT employs two porous-tube diluters with a catalytic stripper to remove volatile species, along with advanced mass-flow controllers (MFCs) to provide substantially real-time dilution-ratio measurement and control. The PTT is a variable-dilution-factor dilution and conditioning system, which can work in tandem with an Engine Exhaust Particle Sizer™ (EEPS™) spectrometer, enabling time-resolved measurements of particle size distribution.

FIG. 1 shows a dilution system 100 of the prior art used to dilute a sample prior to sizing particles form the sample in a particle-sizing instrument. The dilution system 100 includes a primary diluter 103, a heat exchanger 107 (e.g., a device known in the art to add heat into or remove heat from gases flowing therethrough), a catalytic stripper 111, a secondary diluter 113, and a particle-sizing instrument 119. An MFC module 137 includes three mass-flow controllers. A first $MFC_1$ 137A and a second $MFC_2$ 137B control an amount of a clean gas (e.g., clean, dry air (CDA), clean compressed-gas, or other substantially particle-free gas) received from a clean-gas inlet 141. A third $MFC_3$ 137C controls an amount of flow gas removed from between the dilution stages comprising the primary diluter 103 and the secondary diluter 113. A combined value from the primary diluter 103 and the secondary diluter 113 determine a total dilution factor of the dilution system 100. A filter 123 upstream of the third $MFC_3$ 137C removes a large percentage of particulate matter prior to the excess gas passing through a pump 139A and venting the gas to a pump outlet 139B.

The first $MFC_1$ provides the clean gas to an inlet 105 of the primary diluter 103, which mixes the clean gas with a particle-laden gas sample (e.g., engine exhaust) received from a sample inlet 101. A combination of the clean gas and the particle-laden gas subsequently exits the primary diluter 103 and enters the catalytic stripper 111. The catalytic stripper 111 uses, for example, a catalytic element, to remove particles and gas-phase semi-volatile fractions of the particle-laden gas.

The second $MFC_2$ 137B provides the clean gas to an inlet 115 of the secondary diluter 113, which mixes the clean gas with an output from the catalytic stripper 111, thereby further diluting the combination of the clean gas and the particle-laden gas. An output from the second diluter 113 is then directed into the particle-sizing instrument 119. The particle-sizing instrument 119 frequently comprises an engine-exhaust particle-sizing instrument (e.g., such as a TSI® Incorporated, Model 3090 Engine-Exhaust Particle-Sizer™ (EEPS™)).

However, a significant limitation of various types of prior art dilution systems is that the mass-flow controllers in the system must be calibrated periodically to recognize an actual particle concentration versus an assumed particle concentration. The difference between an actual concentration and the assumed particle concentration is based on knowing an actual value of a dilution factor.

The dilution factor, $D_f$, is defined as a total flow to a sample flow:

$$D_f = \frac{\text{total flow}}{\text{sample flow}}$$

Consequently, as the sample flow becomes smaller in relation to the total flow, the dilution factor, $D_f$, can become increasingly inaccurate. As a result, higher dilution factor errors are compounded since the sample flow is smaller. As the relative errors between various ones of the mass-flow controllers increases, an error in the dilution factor, $D_f$, can increase.

A person of ordinary skill in the art will recognize that a relative calibration of the mass-flow controllers relates to a level of precision from MFC-to-MFC, and not necessarily an accuracy of the calibration. That is, a precision and repeatability of measurements is more important than an accuracy of the measurements due to the ratio of dilution factor, $D_f$, shown above. Regardless, with reference to dilution systems of the prior art, all mass-flow controllers must be removed periodically for calibration of the individual mass-flow controllers.

An accuracy of the dilution factor provided by the dilution system 100 was determined by comparing the dilution factor reported by the dilution system 100 to a reference dilution-factor, directly measured by placing four TSI® Model 4140 flow meters on the inlet and outlet of each dilution stage. Results of these accuracy tests are shown in FIGS. 2A through 2C.

For example, FIGS. 2A through 2C show progressively increasing errors in the accuracy of a dilution factor using a prior art dilution system. Each of FIGS. 2A through 2C show a 1:1 dilution factor at different total flow-rates.

Specifically, FIG. 2A shows primary dilution flow accuracy graph 200 for a reported primary dilution factor of up to 40 as a function of reference primary dilution factor. In this case, a total error rate of up to ±10% is shown.

FIG. 2B shows secondary dilution flow accuracy graph 220 for a reported primary dilution factor of up to 60 as a function of reference primary dilution factor. In this case, a total error rate of up to ±20% is shown.

FIG. 2C shows secondary dilution flow accuracy graph 240 for a reported primary dilution factor of up to 600 as a function of reference primary dilution factor. In this case, a total error rate of up to 20% is shown.

In another example, assume a first MFC that is providing dilution gas to a primary diluter is consistently reading high by 1%, and a second MFC that is providing dilution gas to a secondary diluter is consistently reading low by 1%. For a desired 10:1 dilution factor, there will be a 20% error due to the relatively small errors of each of the two MFCs. Consequently, a need exists for a dilution system having flow devices (e.g., mass-flow controllers) that are easy to calibrate, in-situ, to achieve an accurate dilution factor.

Consequently, when controlling a dilution factor by a difference in flows, the accuracy of the flow control must be considered. If only a factory calibration of flow meters is relied upon, a maximum dilution-factor achievable is limited.

The information described in this section is provided to offer the skilled artisan a context for the following disclosed subject matter and should not be considered as admitted prior art.

DETAILED DESCRIPTION

Figure 1:
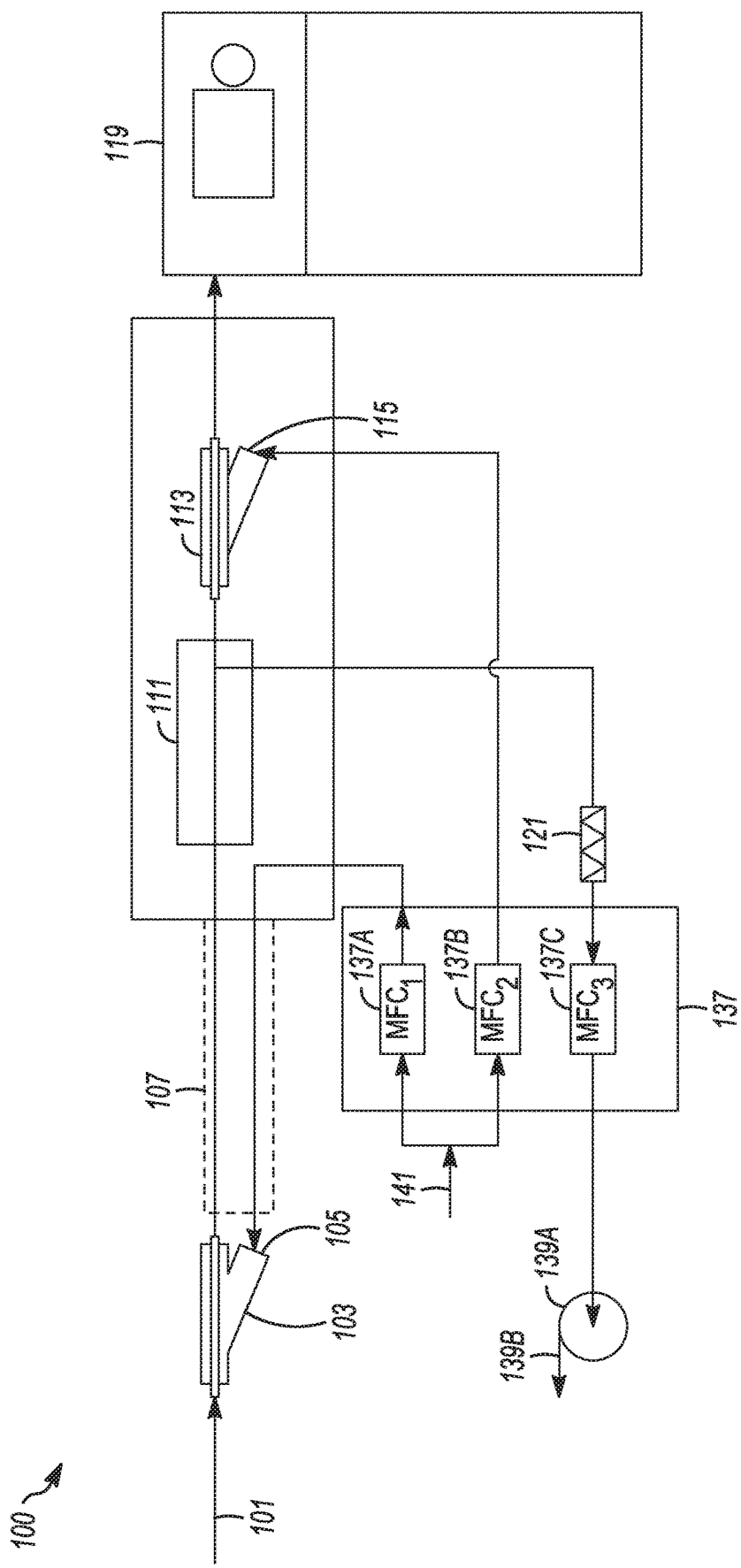
FIG. 1 shows a dilution system of the prior art used to dilute a sample prior to sizing particles form the sample in a particle-sizing instrument.
Figure 2B:
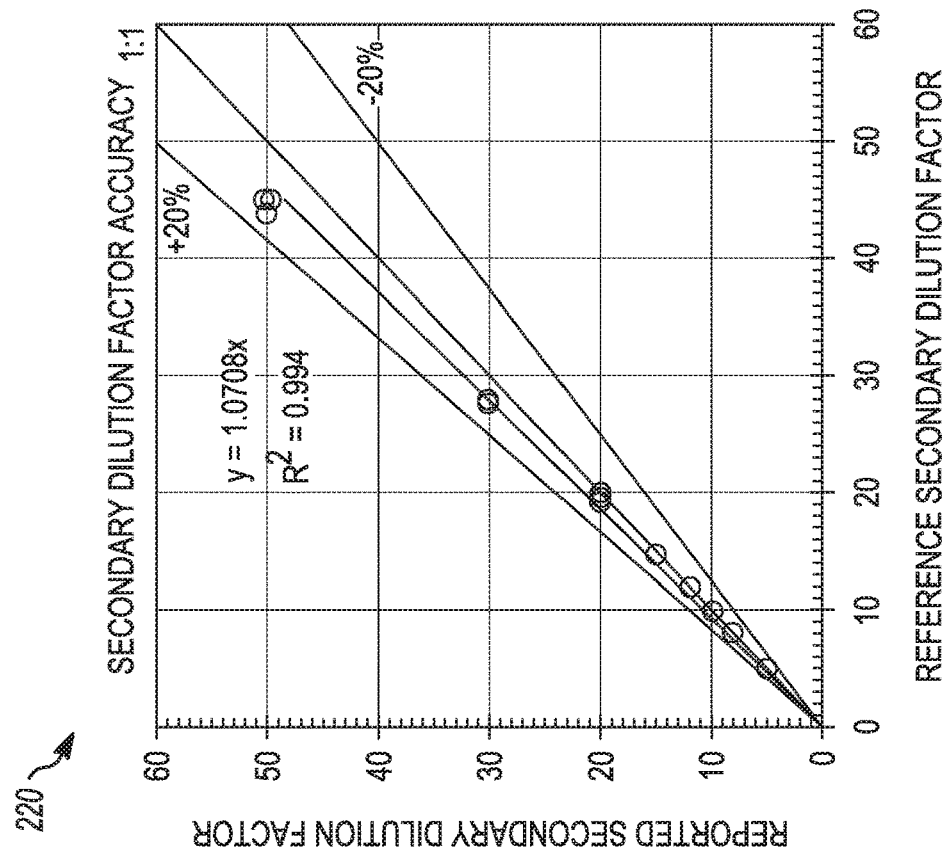
FIGS. 2A through 2C shows progressively increasing errors in the accuracy of a dilution factor using a prior art dilution system.
Figure 2A:
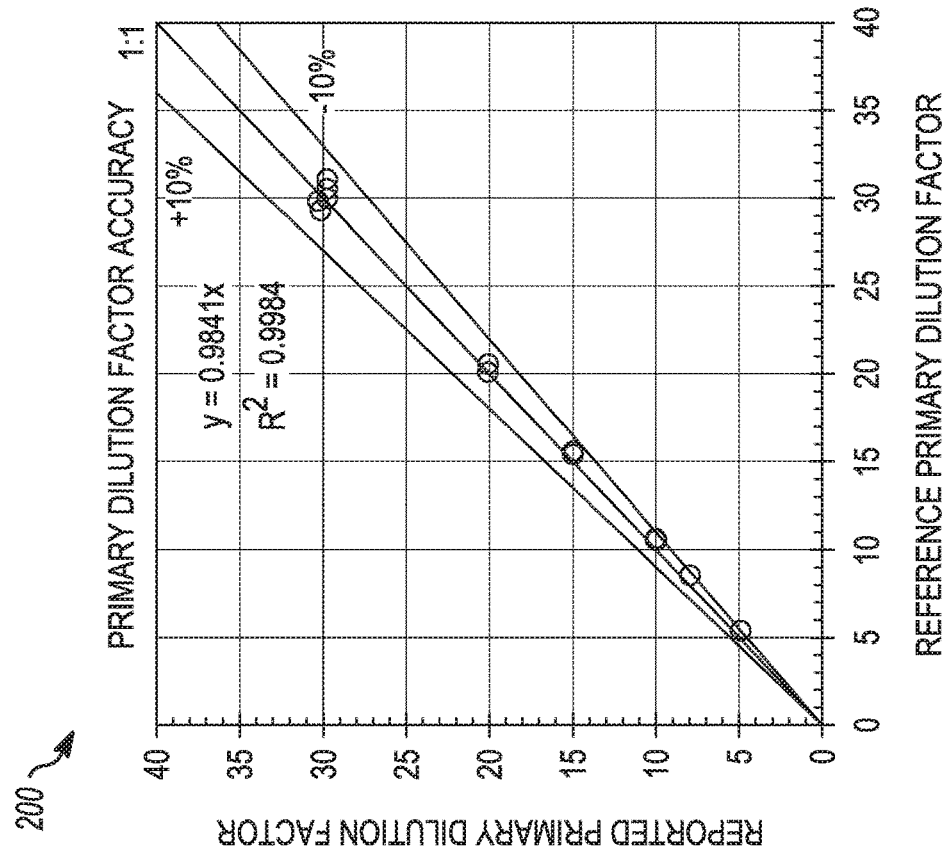
Figure 2C:
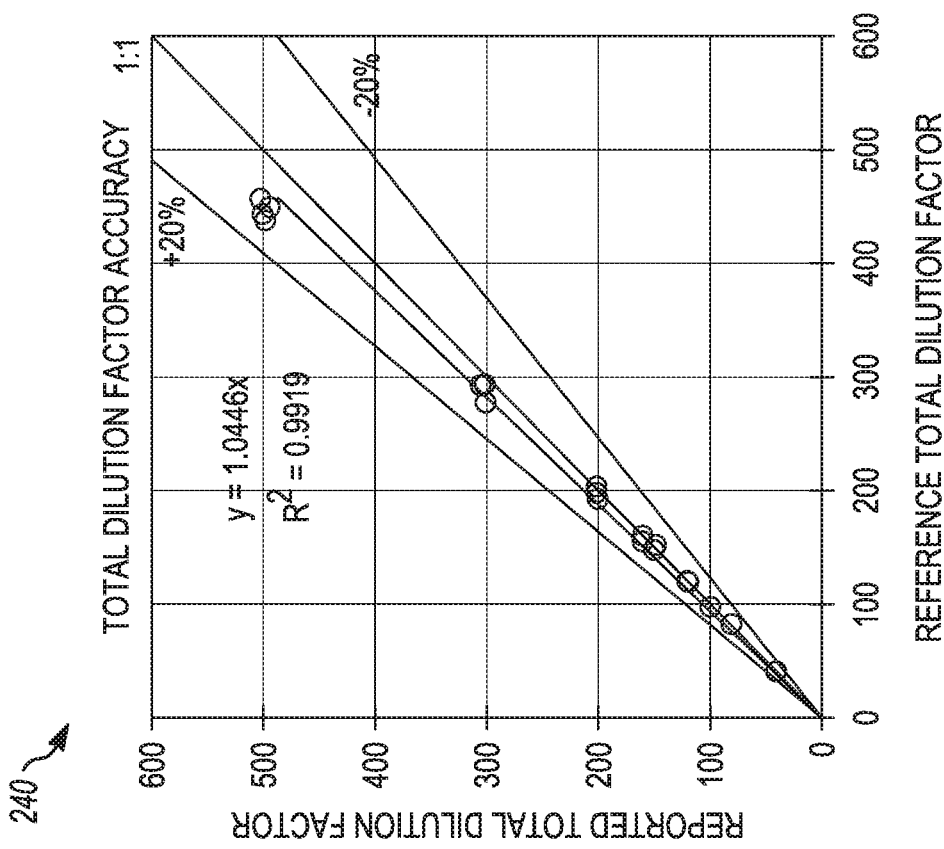

The description that follows includes illustrative examples, devices, and apparatuses that embody various aspects of the disclosed subject matter. In the following description, for purposes of explanation, numerous specific details are set forth in order to provide an understanding of various embodiments of the inventive subject matter. It will be evident however, to those of ordinary skill in the art, that various embodiments of the disclosed subject matter may be practiced without these specific details. Further, well-known structures, materials, and techniques have not been shown in detail, so as not to obscure the various illustrated embodiments.

As used herein, the term "or" may be construed in an inclusive or exclusive sense. Additionally, although various exemplary embodiments discussed below focus on counting particles from high-concentration emission sources, the disclosed subject matter is also related to particle counting and removal of volatile and semi-volatile particles from engine emissions without a need of a volatile particle remover (VPR). Upon reading and understanding the disclosure provided herein, a person of ordinary skill in the art will readily understand that various combinations of the techniques and examples may all be applied serially or in various combinations. As an introduction to the subject, a few embodiments will be described briefly and generally in the following paragraphs, and then a more detailed description, with reference to the figures, will ensue.

Principle of Operation

A diluter in the disclosed subject matter described herein consists of two stages of dilution, a sample line, and a catalytic stripper to evaporate and oxidize volatile particles. Two mass-flow controllers (MFCs) control the air delivered to each diluter and a third MFC controls an amount of flow removed from between the dilution stages, thereby determining the dilution factors. The addition of temperature and pressure measurements at the inlet and outlet of each dilution stage allow for volumetric dilution-control.

As described above, for a dilution system to maintain a stable dilution factor, precise flow control is necessary. To improve on the factory calibration of flow elements (e.g., flow meters and flow controllers) within a diluter, a system of valves has been developed in the disclosed subject matter to allow multiple flow-measurement elements to be placed in series, pairwise, in several different configurations. In each configuration, a flow element is pneumatically coupled in series with either a master flow element, which serves as a reference, and directly calibrated or indirectly calibrated by being placed in series with another flow element that has been directly calibrated. In each valve configuration, a multipoint calibration is performed. Furthermore, the flow-measurement element of a particle-sizing instrument sampling from the diluter is also calibrated to the other flow-measurement elements.

In this manner, all flow element devices are "mirrored" to a single master flow-measurement element, allowing for more accurate dilution factor control than relying on the factory calibration of each flow measurement element alone. Consequently, the disclosed subject matter comprises a system and method for an automated, mirror calibration of multiple flow-measurement devices for improved accuracy in dilution factor.

Figure 3A:
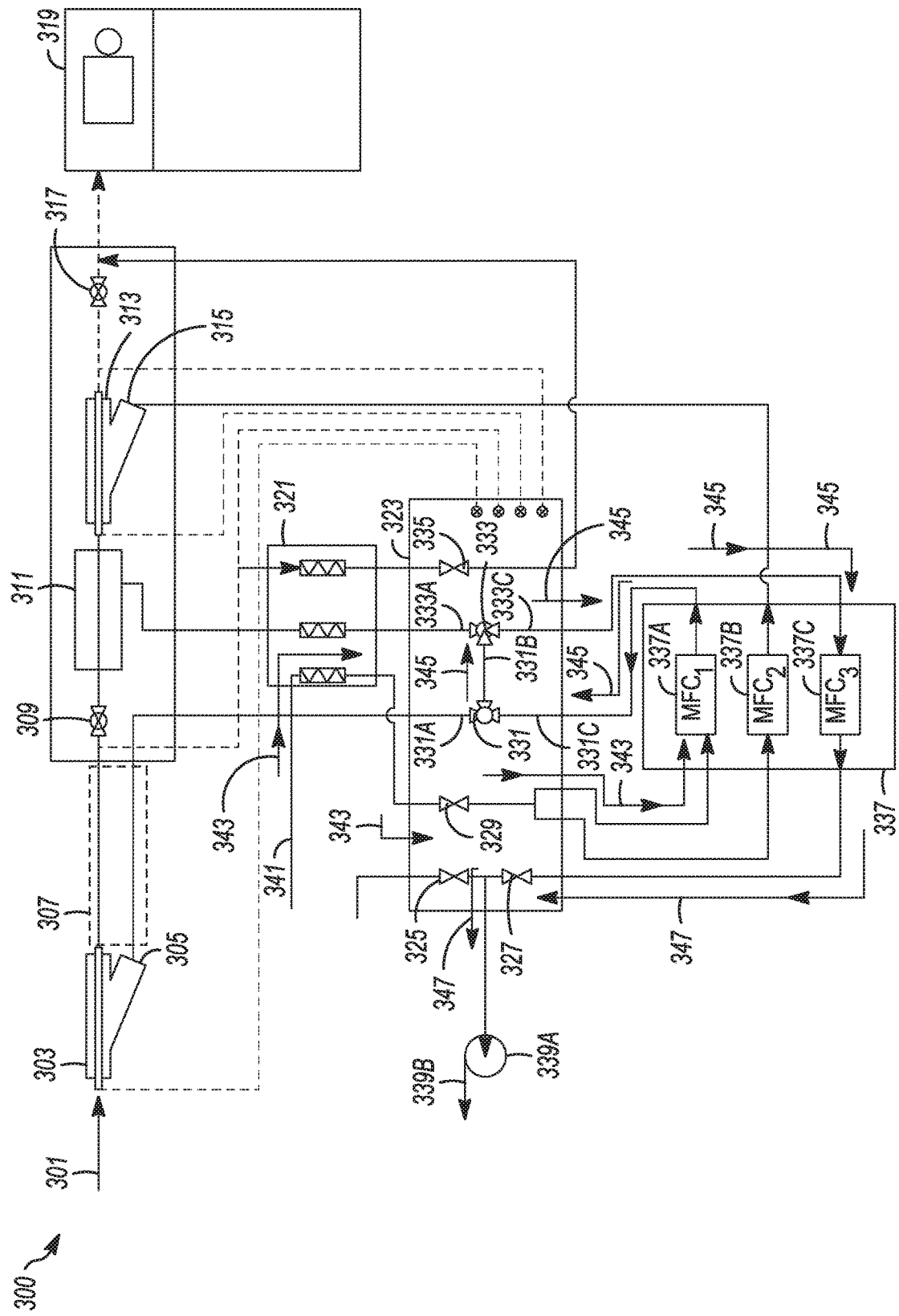
FIG. 3A shows a first phase of an exemplary embodiment of a calibration and dilution system in accordance with various embodiments of the disclosed subject matter in which a third mass-flow controller (MFC, but also applicable to mass-flow meters and mass-flow devices in general) is mirrored to a first MFC used as a global master unit to calibrate the third MFC.

FIG. 3A shows a first phase of an exemplary embodiment of a calibration and dilution system 300 in accordance with various embodiments of the disclosed subject matter in which a third mass-flow controller (but also applicable to mass-flow meters and other flow-measurement elements in general) is mirrored to a first MFC used as a global master unit to calibrate the third MFC. As discussed above, the dilution system 300 allows an end user to calibrate mass-flow controllers in-situ. That is, the MFCs within the calibration and dilution system 300 do not need to be removed from the system to be calibrated. Consequently, the MFCs are calibrated for precision and not necessarily for accuracy. However, since the readings from the MFCs are relative to each other (recall that the dilution factor is a ratio), accuracy of calibration is less important than precision of calibration, one MFC to another. Also, readings from each of the MFCs within the calibration and dilution system 300 should be repeatable. However, repeatability from one measurement to another is typically readily achievable with most contemporaneous MFC devices today.

With continuing reference to FIG. 3A, the calibration and dilution system 300 is shown to include a primary diluter 303, a heat exchanger 307, a first valve 309, a volatile-particle remover 311, a secondary diluter 313, a second valve 317, and a particle-sizing instrument 319. The dilution system 300 is also shown to include a filter module 321, a valve block 323, a vacuum pump 339A with a pump outlet 339B, and an MFC module 337.

The primary diluter 303 and the secondary diluter 313 can be any type of dilution-type mechanism such as a concentric-tube diluter or other diluter device that mixes two or more input-gas flow streams into a single-output flow stream. The heat exchanger 307 can comprise heating and/or cooling devices (e.g., thermoelectric devices (TEDs) or Peltier devices) to heat or cool a gas stream flowing therethrough. The volatile-particle remover 311 may comprise, for example, a catalytic stripper or other device to remove volatile particles and gas-phase semi-volatile fractions of a particle-laden gas that is present in a sampled gas-stream at an inlet 301 to the primary diluter 303. The sampled gas-stream from the inlet 301 is received by the primary diluter 303 where the sampled gas-stream is mixed with clean gas received at a dilution-gas inlet 305 on the primary diluter 303. The sampled gas-stream at an inlet 301 continues through the volatile-particle remover 311 and is received by the secondary diluter 313 where the sampled gas-stream is mixed with clean gas received at a dilution-gas inlet 315 on the secondary diluter 313.

The first valve 309 and the second valve 317 may comprise various types of two-way valves such as, for example, globe valves, shut-off valves, and solenoid-operated valves. In a specific exemplary embodiment, the first valve 309 and the second valve 317 each comprise solenoid-operated valves that are operable by a control signal received from a system controller (not shown in FIG. 3A but described below with reference to FIG. 7). The particle-sizing instrument 319 may comprise, for example, engine-exhaust particle-sizing instrument type of instrument (e.g., such as a TSI® Incorporated, Model 3090 Engine-Exhaust Particle-Sizer™ (EEPS™)).

The filter module 321 contains a number of filters, pneumatically coupled or connected to various gas-flow lines as shown. Each of the filters may comprise one or more of various types of particulate-gas filters known in the art, such as a high-efficiency particulate air (HEPA) filler or an ultra-low particulate air (ULPA) filter.

The valve block 323 comprises a number of two-way valves and three-way valves, each of which is pneumatically coupled to other parts of the dilution system 300. In a specific exemplary embodiment, the valve block 323 includes a venting valve 325, coupled to an outlet vent on a first side and the vacuum pump 339A on a second side; a pump valve 327, coupled on a first side to the vacuum pump 339A and on a second side to the outlet of a third $MFC_3$ 337C; and a clean-gas valve 329 coupled on a first side to a clean-gas supply and on a second side to both an inlet of a first $MFC_1$ 337A and an inlet of a second $MFC_2$ 337B in the MFC module 337. A first three-way valve 331 is coupled on a first outlet line 331A to a dilution-gas inlet 305 on the primary diluter 303, on a second outlet line 331B to an inlet of second three-way valve 333. The first three-way valve 331 is also coupled from a common inlet 331C that is coupled to an outlet of the first $MFC_1$ 337A. The second three-way valve 333 is coupled on an outlet line 333C to an inlet of a third $MFC_3$ 337C and on a second inlet 333A from a filter within the filter module 321. A makeup-gas valve 335 is coupled from another filter in the filter module 321. Each of the valves may comprise various types of two-way valves or three-way valves such as, for example, globe valves, shut-off valves, and solenoid-operated valves, controlled by an electrical signal or a pneumatic actuator.

A clean-gas inlet 341 may be coupled to a facility clean-gas supply or other clean-gas supply. The clean-gas supply may provide clean, dry air (CDA), nitrogen, or any other clean gas to the clean-gas inlet 341. The third filler in the filter module 321 receives a makeup-gas flow at an inlet 367 from a makeup-gas supply. The makeup-gas supply may the same as or similar to the facility clean-gas supply or other clean-gas supply.

With continuing reference to FIG. 3A, a first phase of a calibration of the third $MFC_3$ 337C to the first $MFC_1$ 337A (with the first $MFC_1$ 337A acting in FIG. 3A as a global master-calibration device) is described in detail below. However, at a high level, an outlet of the first $MFC_1$ 337A is pneumatically coupled, through the valve block 323, to the inlet of the third $MFC_3$ 337C such that the two mass-flow controllers are pneumatically coupled in series with one another in a closed-loop arrangement. Gas is drawn through the third $MFC_3$ 337C, and through a series of valves, through the first $MFC_1$ 337A, which is open to an inlet coupled to a first filter in the filter module 321.

To pneumatically couple the third $MFC_3$ 337C to the first $MFC_1$ 337A, the clean-gas valve 329 is opened so that clean gas may flow from the clean-gas inlet 341 along a flow path 343 to the inlet of the first $MFC_4$ 337A. The first three-way valve is adjusted such that gas may flow from the common inlet 331C to the second outlet line 331B. The second three-way valve 333 is adjusted such that the clean gas from the second outlet line 331B may flow to the outlet line 333C. At the outlet of the first $MFC_1$ 337A, the clean gas is now able to continue to flow along a flow path 345. The pump valve 327 is opened and the venting valve 325 is closed such that the vacuum pump 339A may pull the gas along the flow path 345 through the $MFC_3$ 337C to flow path 347.

Under this closed-loop arrangement of valves noted immediately above, the third MFC$_3$ 337C is pneumatically coupled to the first MFC$_1$ 337A. Consequently, the two mass-flow controllers now have the same level of gas flowing through each. Therefore, the third MFC$_3$ 337C can be adjusted to mirror the amount of gas flowing through the first MFC$_1$ 337A. Generally, an output value of a mass-flow controller is linear with flow rate (even though there may be polynomial-based equations programmed into the MFC). Therefore, the third MFC$_3$ 337C can be adjusted (e.g., electronically, either within the MFC or at a remote location that is coupled to the MFC) to match the reading of the first MFC$_1$ 337A. Although the dilution factor is only dependent on a precision of mass-flow controllers within the calibration and dilution system 300, the first MFC$_1$ 337A may also be removed from the system and separately calibrated, periodically, for accuracy and precision of the reported measurements. Such calibration techniques are known to a person of ordinary skill in the art.

Figure 3B:
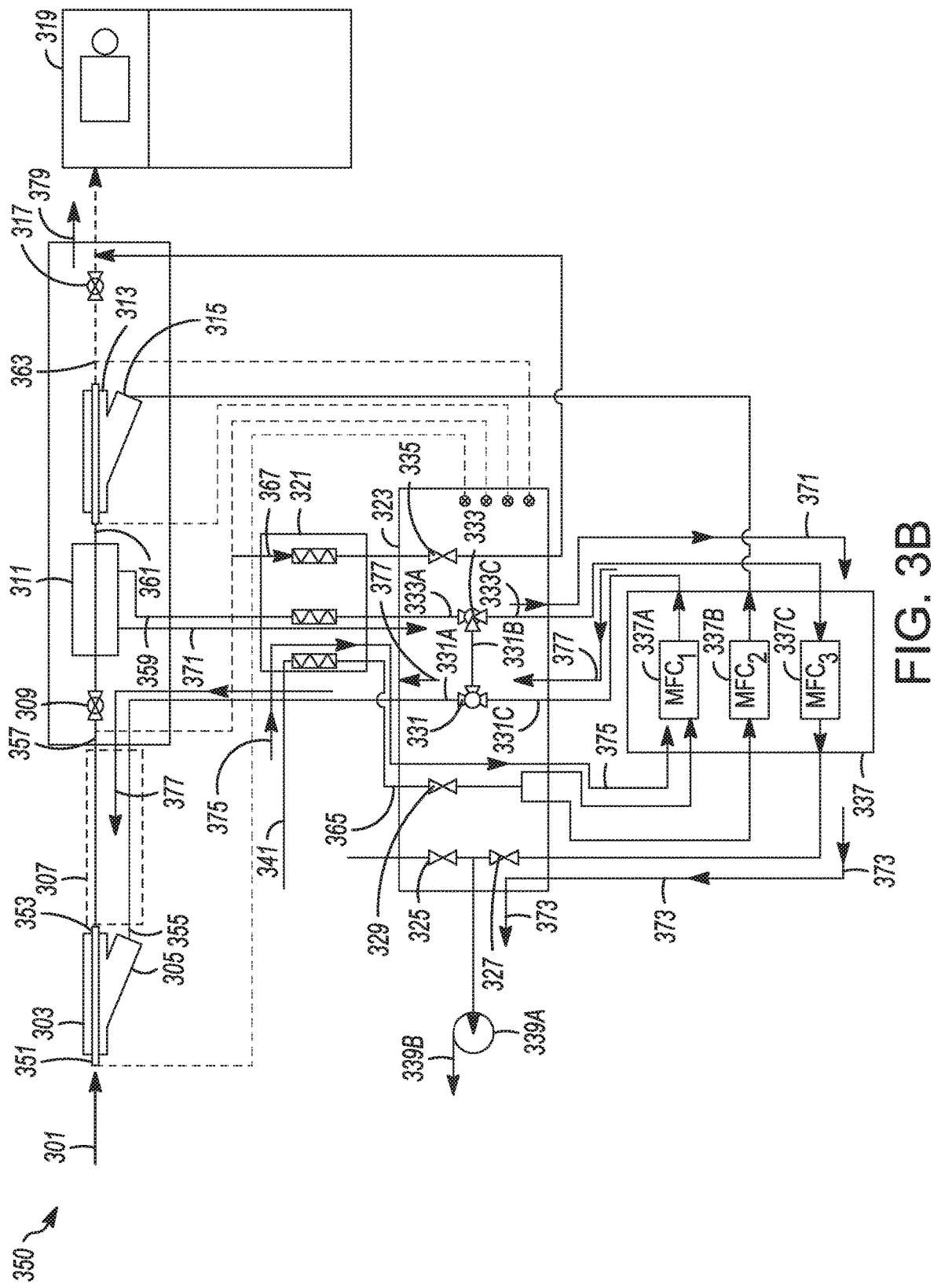
FIG. 3B shows an exemplary embodiment of the calibration and dilution system of FIG. 3A with valves reset for use as a dilution path.

FIG. 3B shows an exemplary embodiment of the calibration and dilution system 300 of FIG. 3A with valves reset for use as a dilution-path system 350. The second three-way valve 333 is adjusted to direct gas flow from the volatile-particle remover 311 to the second inlet of the second three-way valve 333 to the outlet line 333C along a flow path 371. The gas flow continues through the third MFC$_3$ 337C to the vacuum pump 339A to the pump outlet 339B along flow path 373. The second valve 317 is adjusted to be open from an outlet of the secondary diluter 313 to an inlet of the particle-sizing instrument 319. FIG. 3B also indicates a number of positions 351, 353, 357, 359 361, and 363 at which one or more of a pressure and a temperature gauge may be placed to provide additional information to an end user of the calibration and dilution system 300. A person of ordinary skill in the art will recognize that a position, open or closed, of the second valve 317 is unimportant for the calibration and dilution system 300 of FIG. 3A as it cannot be in pneumatic communication with the closed-loop system described above regardless of a position of the second valve 317. If needed by the particle-sizing instrument 319, clean gas may be received from an inlet 367 on the filter module 321.

For the first MFC$_1$ 337A, clean gas is delivered from a clean-gas inlet 341, through the filter module 321 to the first MFC$_1$ 337A along flow path 375. The first three-way valve 331 is opened for a flow path 377 from the first MFC$_1$ 337A through the common inlet 331C to the first outlet line 331A to the dilution-gas inlet 305 of the primary diluter 303 along flow path 377 to be mixed with the sampled gas-stream from the inlet 301.

Figure 4A:
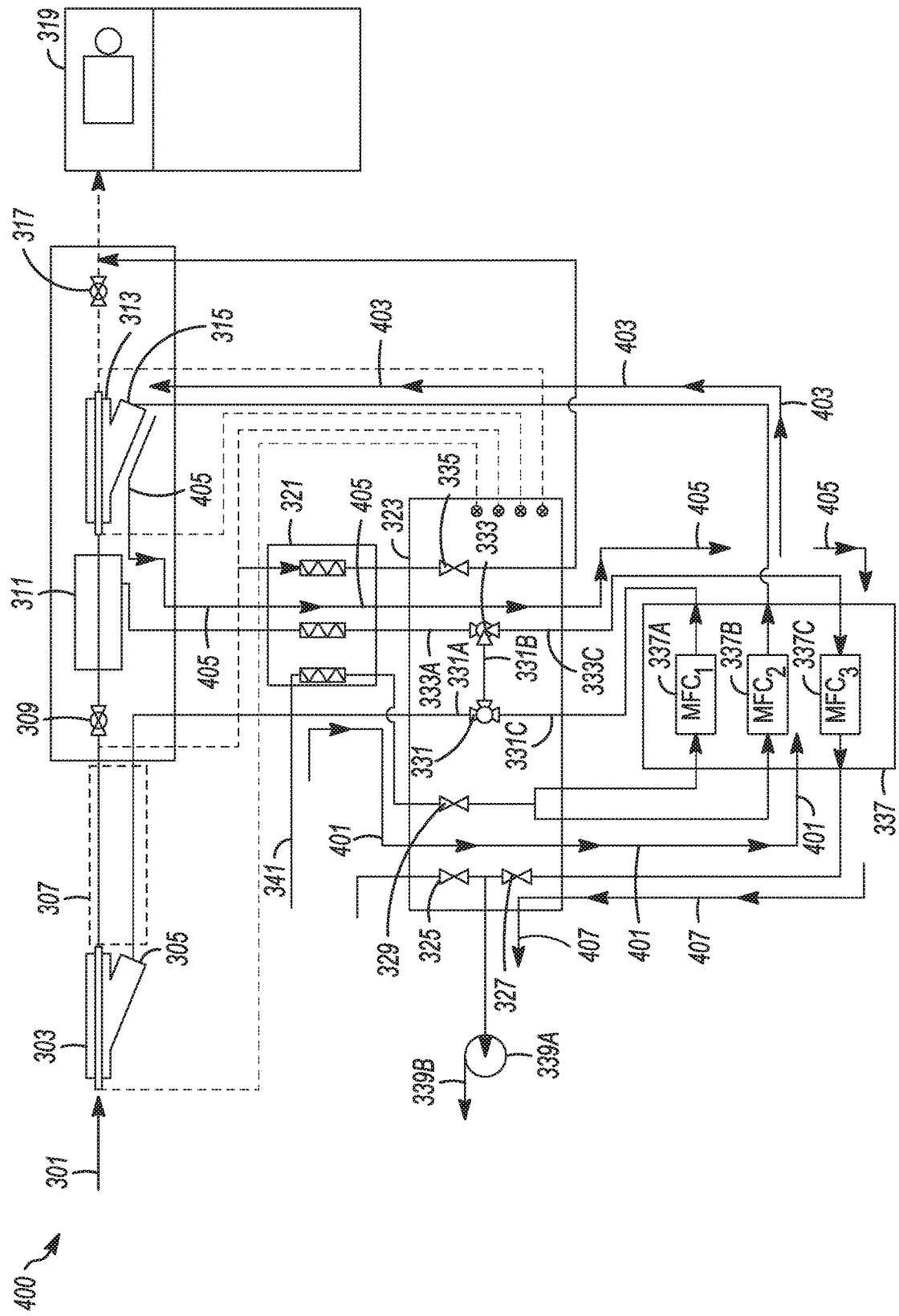
FIG. 4A shows a first phase of an exemplary embodiment of a calibration and dilution system in accordance with various embodiments of the disclosed subject matter in which a second MFC is mirrored to the third MFC calibrated in accordance with FIG. 3A, where the third MFC is now used as a master unit for the second phase to calibrate the second MFC.

FIG. 4A shows a first phase of an exemplary embodiment of a calibration and dilution system 400 in accordance with various embodiments of the disclosed subject matter in which the second MFC$_2$ 337B is mirrored to the third MFC$_3$ 337C calibrated in accordance with FIG. 3A, where the third MFC$_3$ 337C is now used as a master unit for the second phase to calibrate the second MFC$_2$ 337B. Recall that the third MFC$_3$ 337C was calibrated and adjusted to correlate to the first third MFC$_3$ 337C in accordance with the drawings and text of FIG. 3A above.

To calibrate the second MFC$_2$ 337B to the third MFC$_3$ 337C, the two mass-flow controllers are first connected pneumatically in series with one another in a closed loop. The clean-gas valve 329 is opened such that the second MFC$_2$ 337B may have a supply of gas from the clean-gas inlet 341, filtered by the filter module 321, and received along a flow path 401. After the clean gas is received at the inlet of the second MFC$_2$ 337B, the clean gas continues along flow path 403 through the dilution-gas inlet 315 on the secondary diluter 313. The clean gas continues through what would ordinarily be considered the inlet of the secondary diluter 313, along flow path 405 to the inlet of the third MFC$_3$ 337C. The pump valve 327 is opened from the vacuum pump 329A to the outlet of the third MFC$_3$ 337C and the venting valve 325 is closed. The vacuum pump 339A draws the clean gas from the outlet of the third MFC$_3$ 337C, along flow path 407, through the vacuum pump 339A to the pump outlet 339B. The two mass-flow controllers are now connected pneumatically in series with one another in a closed loop.

Under this closed-loop arrangement of valves noted immediately above, the second MFC$_2$ 337B is pneumatically coupled to the third MFC$_3$ 337C. Consequently, the two mass-flow controllers now have the same level of gas flowing through each. Therefore, the second MFC$_2$ 337B can be adjusted to mirror the amount of gas flowing through the third MFC$_3$ 337C. As noted above, an output value of a mass-flow controller is generally linear with flow rate (even though there may be polynomial-based equations programmed into the MFC). Therefore, the second MFC$_2$ 337B can be adjusted (e.g., electronically, either within the MFC or at a remote location that is coupled to the MFC) to match the reading of the third MFC$_3$ 337C.

Figure 4B:
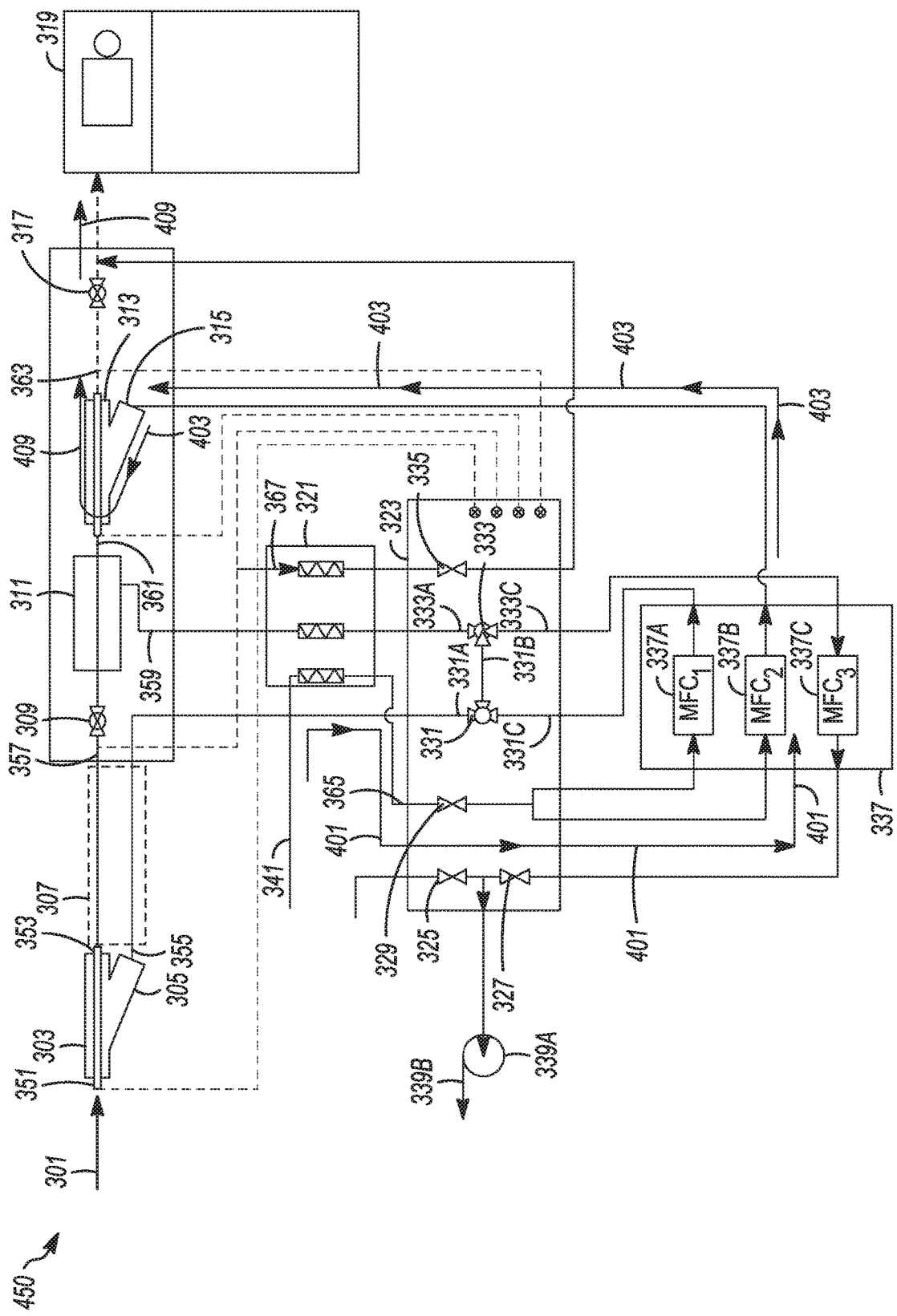
FIG. 4B shows an exemplary embodiment of the calibration and dilution system of FIG. 4A with valves reset for use as a dilution path.

FIG. 4B shows an exemplary embodiment of the calibration and dilution system 400 of FIG. 4A with valves reset for use as a dilution-path system 450. The flow paths 401, 403 of FIG. 4A have not changed. However, the second three-way valve 333 has now been adjusted to prevent the clean gas from flow path 405 from flowing from the second inlet 333A through to the outlet line 333C. Consequently, the clean gas along the flow path 403 can no longer flow back through the outlet of the secondary diluter 313 to the flow path 405 as did in FIG. 4A. Instead, the clean gas along the flow path 403 is now mixed with the sampled gas-stream in the secondary diluter 313 along flow path 409 and continues through the second valve 317 to the particle-sizing instrument 319. The adjustments of the valves as shown and described herein with reference to FIG. 4B may be combined with the adjustments of valves as described above with reference to the adjustments of the valves as shown and described herein with reference to FIG. 3B so that a person of ordinary skill in the art will recognize and appreciate how the overall dilution system functions.

Figure 5:
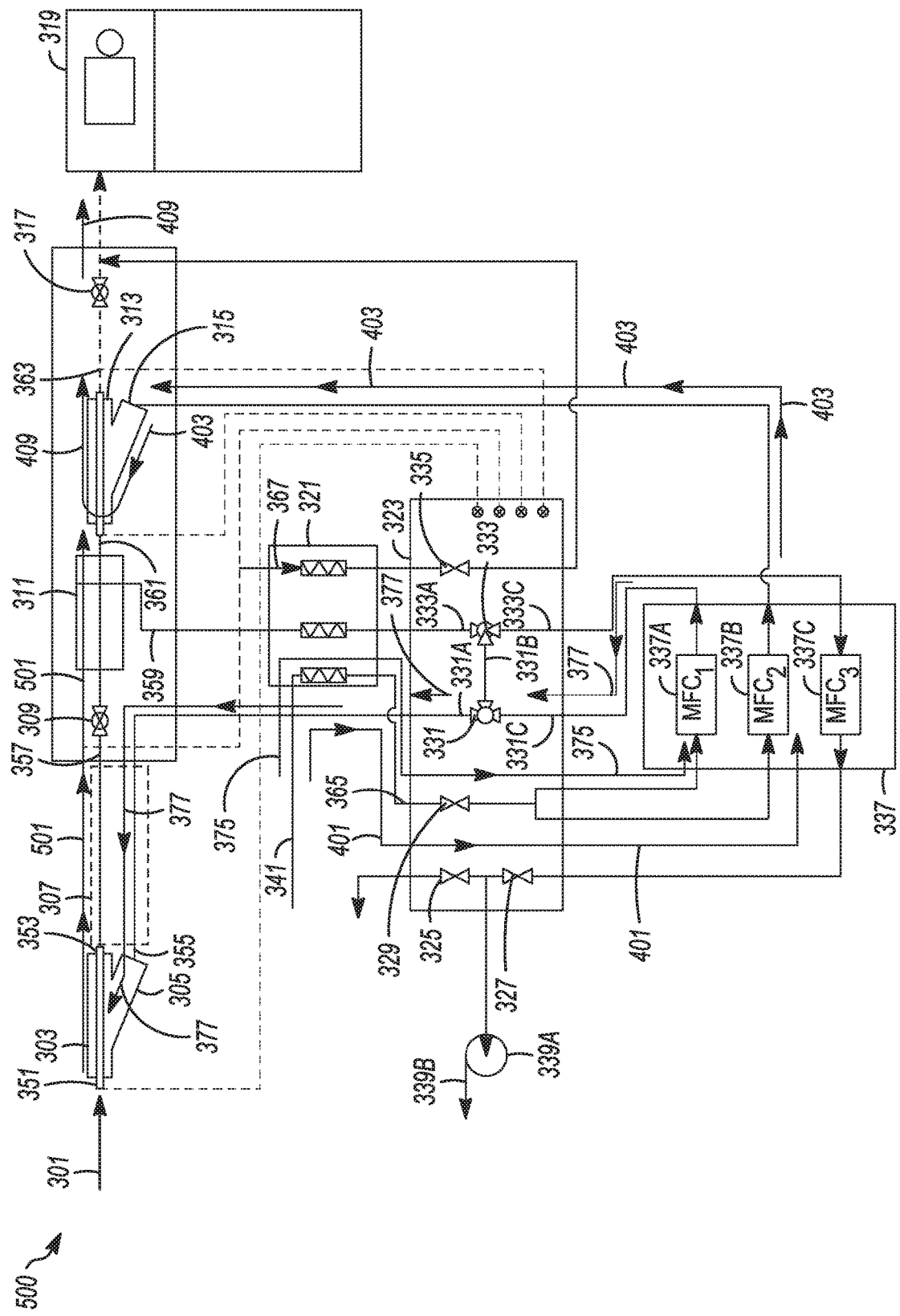
FIG. 5 shows a third phase of an exemplary embodiment of a calibration and dilution system in accordance with various embodiments of the disclosed subject matter in which a fourth MFC, within an aerosol spectrometer, is mirrored to a difference of the second (now calibrated) MFC and the third (now calibrated) MFC.

FIG. 5 shows a third phase of an exemplary embodiment of a calibration and dilution system 500 in accordance with various embodiments of the disclosed subject matter in which a fourth MFC, within an aerosol spectrometer (e.g., the particle-sizing instrument 319), is mirrored to a difference of the second MFC$_2$ 337B (which is now calibrated) and the third MFC$_3$ 337C (which is also now calibrated). The makeup-gas valve 335 is closed to prevent gas from flowing into the particle-sizing instrument 319 from the inlet 367. The second valve 317 is open to allow gas input through the second MFC$_2$ 337B and diverted from the third MFC$_3$ 367C to be measured by the particle-sizing instrument 319. The first valve 309 is closed to prevent any gas from entering or leaving the closed-loop path formed by the pneumatic flow-path described immediately above. The second three-way valve 333 is open from the first outlet line 331A (now serving as an inlet to the second three-way valve 333) to the outlet line 333C to allow a portion of the gas that flowed along flow path 403 to flow into the third MFC$_3$ 337C. A position of the first three-way valve 331 is unimportant since it is not part of this pneumatic flow-path.

Therefore, the flow measured by the MFC that is internal to the particle-sizing instrument 319 is based on $$\dot{Q}_{319} = \dot{Q}_{337B} - \dot{Q}_{337C}$$

where $\dot{Q}_{319}$, $\dot{Q}_{337B}$, and $\dot{Q}_{337C}$ refer to mass flowrates through the particle-sizing instrument 319, the second MFC$_2$ 337B, and the third MFC$_3$ 367C, respectively.

Based on the described flow paths, a person of ordinary skill in the art will recognize that a total flow of gas into the particle-sizing instrument 319 is now based on a difference in gas flowrates between the second MFC$_2$ 337B and the third MFC$_3$ 337C. Therefore, the MFC within the particle-sizing instrument 319 can be adjusted (e.g., electronically, either within the MFC or at a remote location that is coupled to the MFC) to match a difference in readings between the second MFC$_2$ 337B and the third MFC$_3$ 337C. Consequently, at this point at completion of the operations described above with reference to FIGS. 3A, 3B, 4A, 4B, and 5, all four mass-flow controllers (the three mass-flow controllers contained within the MFC module 337 and the MFC contained within the particle-sizing instrument 319.

With continuing reference to FIG. 5, various valves are now repositioned to allow the dilution system 500 to function as a flow diluter. For example, as described above with reference to FIG. 3B and FIG. 4B, the flow paths 371, 373, 375, 377, 401, 403, 409 (also shown in FIG. 5) are used to function as a dilution system prior to the sampled gas flowing along flow path 501 entering the particle-sizing instrument 319. The second valve 317 is open to allow gas in the flow path 501 (now combined with gas in the flow path 409) to continue to the particle-sizing instrument 319. Consequently, at this point at completion of the operations described above with reference to FIGS. 3A, 3B, 4A, 4B, and 5, all four mass-flow controllers (the three mass-flow controllers contained within the MFC module 337 and the MFC contained within the particle-sizing instrument 319.

Figure 6:
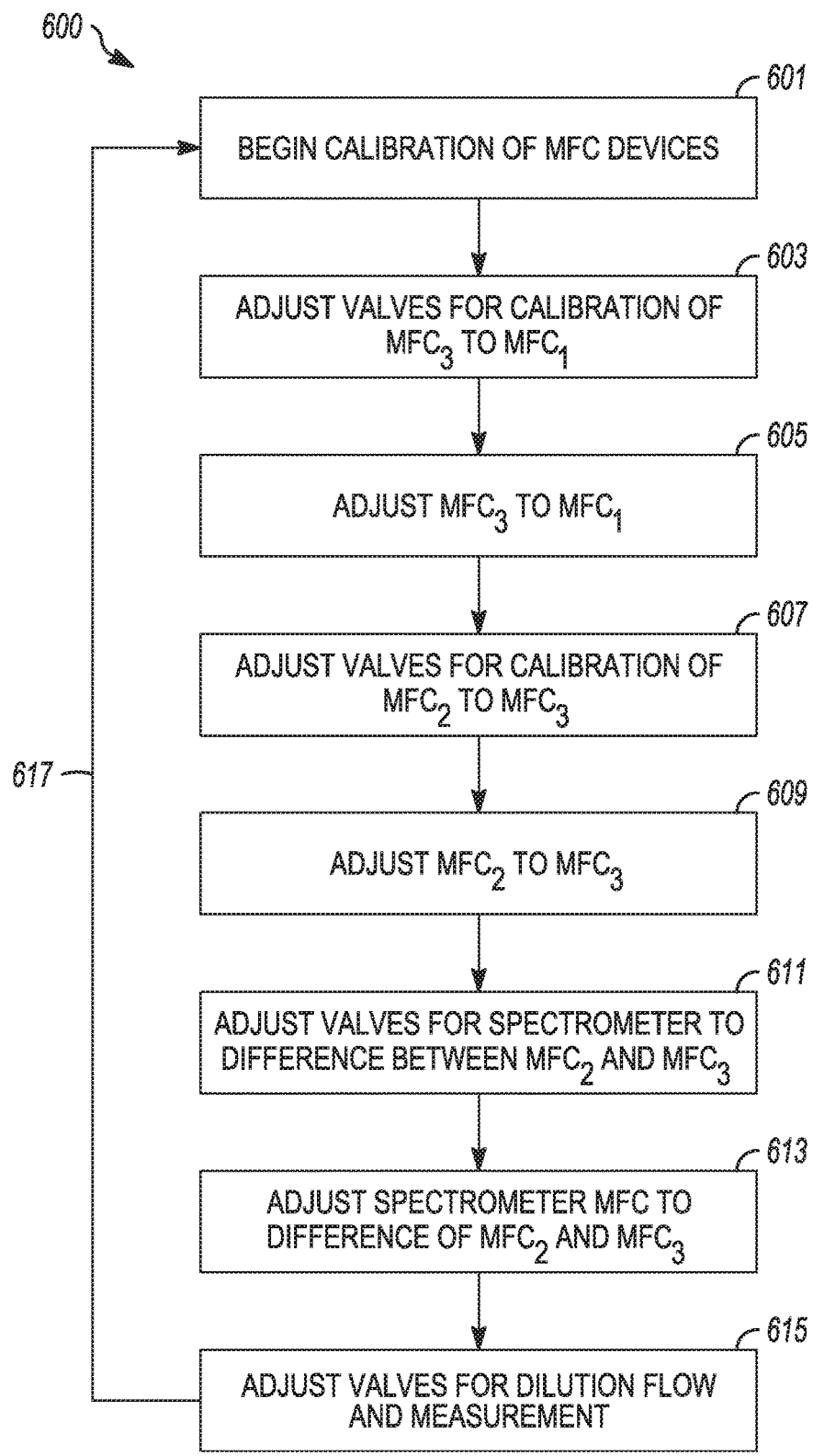
FIG. 6 shows an exemplary embodiment of a method to perform an automated, mirror calibration of multiple flow-measurement devices for improved dilution factor accuracy in accordance with FIGS. 3A, 3B, 4A, 4B, and 5.

FIG. 6 shows an exemplary embodiment of a method 600 to perform an automated, mirror calibration of multiple flow-measurement devices for improved dilution factor accuracy in accordance with FIGS. 3A, 3B, 4A, 4B, and 5. Each of the various valve adjustment operations may be performed automatically. For example, as discussed above, each of the various valves shown and described above may be equipped with automatic devices to open and close the valves, or to adjust the valves between various flow paths (e.g., in the case of the three-way valves). Such automatic devices include electrically or pneumatically operated solenoids within the valves. Other types of valve control devices are known in the relevant art.

At operation 601, the method 600 begins the calibration of the three mass-flow controllers of the MFC module 337 and the MFC within the particle-sizing instrument 319. At operation 603, appropriate ones of the valves are adjusted as described above for calibration (e.g., mirroring) of the third MFC$_3$ 337C to the first MFC$_1$ 337A. The third MFC$_3$ 337C is then adjusted to match the reported flow rate of the first MFC$_1$ 337A at operation 605.

At operation 607, appropriate ones of the valves are adjusted as described above for calibration (e.g., mirroring) of the second MFC$_2$ 337B to the now-calibrated third MFC$_3$ 337C. The second MFC$_2$ 337B is then adjusted to match the reported flow rate of the third MFC$_3$ 337C at operation 609.

At operation 611, appropriate ones of the valves are adjusted as described above for calibration (e.g., mirroring) of the MFC within the particle-sizing instrument 319 to measure a difference of readings between the readings reported by the now-calibrated second MFC$_2$ 337B to the now-calibrated third MFC$_3$ 337C. The MFC within the particle-sizing instrument 319 is then adjusted, at operation 613, to the difference of readings between the readings reported by the now-calibrated second MFC$_2$ 337B to the now-calibrated third MFC$_3$ 337C.

At operation 615, the valves are adjusted as described above such that the dilution and calibration system is used for dilution flow and measurement. One or more operations of the method 600 may repeated at loop 617 as frequently as desired.

Machines with Instructions to Perform Various Operations

Figure 7:
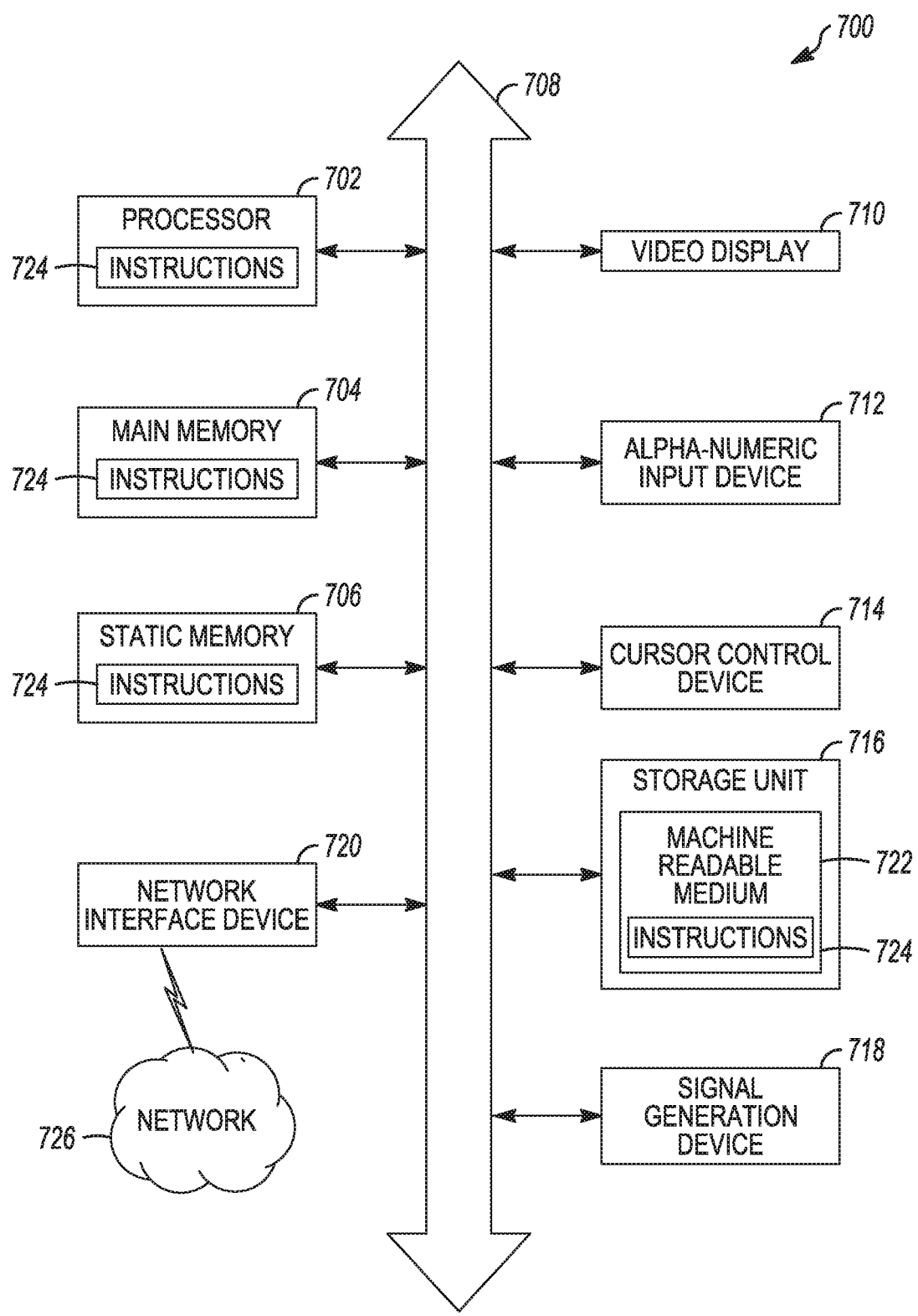
FIG. 7 shows a simplified block diagram of a machine in an example form of a computing system within which a set of instructions for causing the machine to perform any one or more of the methodologies and operations discussed herein may be executed.

FIG. 7 is a block diagram illustrating components of a machine 700, according to some embodiments, able to read instructions from a machine-readable medium e.g., a non-transitory machine-readable medium, a machine-readable storage medium, a computer-readable storage medium, or any suitable combination thereof) and perform any one or more of the methodologies discussed herein. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RTIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alpha-numeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 (e.g., a tangible and/or non-transitory machine-readable storage medium) on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media (e.g., tangible and/or non-transitory machine-readable media). The instructions 724 may be transmitted or received over a network 726 via the network interface device 720. For example, the network interface device 720 may communicate the instructions 724 using any one or more transfer protocols (e.g., hypertext transfer protocol (HTTP)).

In some embodiments, the machine 700 may be a portable computing device, such as a smart phone or tablet computer, and have one or more additional input components (e.g., sensors or gauges). Examples of such additional input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 700), such that the instructions, when executed by one or more processors of the machine (e.g., the processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 724 may further be transmitted or received over a network 726 (e.g., a communications network) using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

As noted above, any of the valves described herein may be implemented as valves that are controllable, for example, either electrically or pneumatically, remotely, by a program, software, firmware, or hardware-based, or a combination thereof. The disclosed subject matter therefore allows calibration of a diluter system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC.

A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware-module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other diluter system embodiments discussed herein. For example, although various embodiments of methods, operations, and processes have been described, these methods, operations, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A calibration and dilution system, comprising:
   a primary diluter;
   a secondary diluter, the primary diluter and the secondary diluter being pneumatically coupled to one another through a gas supply line;
   a volatile-particle remover configured to be coupled on an inlet side to the primary diluter and on a first outlet side to the secondary diluter, the volatile-particle remover further including a secondary outlet pneumatically located between the inlet side and the outlet side;
   a first mass-flow device to serve as a global reference and provide a supply of clean gas to the primary diluter;

a second mass-flow device configured to be coupled to provide a supply of clean gas to the secondary diluter;

a third mass-flow device configured to be coupled to one of the first mass-flow device and the second mass-flow device, the third mass-flow device further configured to be coupled to the secondary outlet side of the volatile-particle remover;

a plurality of valves coupled to at least the first mass-flow device, the second mass-flow device, the third mass-flow device, the primary diluter, the secondary diluter, and the volatile-particle remover, the calibration and dilution system being further configured such that each of the second mass-flow device and the third mass-flow device can be calibrated in-situ relative to at least one of the remaining mass-flow devices without having to remove any of the mass-flow devices from the calibration and dilution system.

2. The calibration and dilution system of claim 1, wherein the plurality of valves is configured to place the third mass-flow device pneumatically in series with only the first mass-flow device to calibrate the third mass-flow device in accordance with a reported flow rate from the first mass-flow device.

3. The calibration and dilution system of claim 1, wherein the plurality of valves is configured to place the second mass-flow device pneumatically in series with only the third mass-flow device to calibrate the second mass-flow device in accordance with a reported flow rate from the third mass-flow device.

4. The calibration and dilution system of claim 1, wherein the plurality of valves is configured to place the first mass-flow device pneumatically in series with the primary diluter to use the calibration and dilution system to incorporate a primary dilution path.

5. The calibration and dilution system of claim 1, wherein the plurality of valves is configured to place the second mass-flow device pneumatically in series with the secondary diluter to use the calibration and dilution system to incorporate a secondary dilution path.

6. The calibration and dilution system of claim 1, wherein an inlet of the secondary diluter is coupled pneumatically to an outlet of the primary diluter to provide two stages of dilution.

7. The calibration and dilution system of claim 1, wherein the volatile-particle remover comprises a catalytic stripper to evaporate and oxidize volatile particles from the calibration and dilution system.

8. The calibration and dilution system of claim 1, further comprising a particle-sizing instrument coupled downstream of the secondary diluter.

9. The calibration and dilution system of claim 8, wherein the particle-sizing instrument an aerosol spectrometer.

10. The calibration and dilution system of claim 8, wherein the particle-sizing instrument is configured to be coupled pneumatically in series with the second mass-flow device and the third mass-flow device, the particle-sizing instrument to be calibrated to a difference between the second mass-flow device and the third mass-flow device.

11. A calibration system, comprising:
a first flow-measurement element to serve as a global reference and to provide a supply of clean gas;
a second flow-measurement element;
a third flow-measurement element configured to be coupled pneumatically in series with the first flow-measurement element and receive the supply of clean gas from the first flow-measurement element, the third flow-measurement element further configured to be coupled subsequently and pneumatically in series with the second flow-measurement element and provide a supply of clean gas from the third flow-measurement element after being coupled pneumatically to the first flow-measurement element; and a plurality of valves coupled to at least the first flow-measurement element, the second flow-measurement element, and the third flow-measurement element, the calibration system being further configured such that the second flow-measurement element and the third flow-measurement element can be calibrated in-situ without having to remove any of the flow-measurement elements from the calibration system, the second flow-measurement element and the third flow-measurement element being configured to be coupled pneumatically in series upstream to a particle-sizing instrument, a flow rate of the particle-sizing instrument to be determined based on a difference between the second flow-measurement element and the third flow-measurement element.

12. The calibration system of claim 11, further comprising:
a primary diluter; and
a secondary diluter, the primary diluter and the secondary diluter being pneumatically coupled to one another through a gas supply line.

13. The calibration system of claim 12, further comprising a catalytic stripper configured to remove volatile particles and gas-phase semi-volatile fractions of a particle-laden gas that is present in a sampled gas-stream at an inlet to the primary diluter.

14. The calibration system of claim 12, wherein the plurality of valves is configured to place the first flow-measurement element pneumatically in series with the primary diluter to use the calibration and dilution system to incorporate a primary dilution path.

15. The calibration system of claim 12, wherein the plurality of valves is configured to place the second flow-measurement element pneumatically in series with the secondary diluter to use the calibration and dilution system to incorporate a secondary dilution path.

16. The calibration system of claim 11, wherein the plurality of valves is configured to place the third flow-measurement element pneumatically in series with only the first flow-measurement element to calibrate the third flow-measurement element in accordance with a reported flow rate from the first flow-measurement element.

17. The calibration system of claim 11, wherein the plurality of valves is configured to place the second flow-measurement element pneumatically in series with only the third flow-measurement element to calibrate the second flow-measurement element in accordance with a reported flow rate from the third flow-measurement element.

18. A method for calibrating mass-flow devices in situ in a calibration system; the method comprising:
adjusting valves in a plurality of valves that are coupled to the mass-flow devices in the calibration system to couple pneumatically a third mass-flow device to a first mass-flow device, the first mass-flow device being a global reference in the calibration system;
adjusting a reported value of the third mass-flow device to calibrate the third mass-flow device in accordance with a reported flow rate from the first mass-flow device;
adjusting valves in the plurality of valves that are coupled to the mass-flow devices in the calibration system to couple pneumatically a second mass-flow device to the third mass-flow device;

adjusting a reported value of the second mass-flow device to calibrate the second mass-flow device in accordance with a reported flow rate from the third mass-flow device;

coupling pneumatically a particle-sizing instrument in series with the second mass-flow device and the third mass-flow device; and determining a flow rate of the particle-sizing instrument based on a difference between the second mass-flow device and the third mass-flow device.

19. The method of claim 18, wherein the determining of the flow rate of the particle-sizing instrument further comprises calculating a difference between a mass-flow rate output by at least one of the second mass-flow device and the third mass-flow device and a volumetric-flow rate of the particle-sizing instrument.

20. The method of claim 18, further comprising:

coupling pneumatically at least one diluter device to the calibration system; and adjusting valves in the plurality of valves for providing a dilution flow from the at least one diluter device to the particle-sizing instrument.

* * * * *

UNITED STATES PATENT AND TRADEMARK OFFICE
CERTIFICATE OF CORRECTION

Page 1 of 1

PATENT NO. : 11,656,236 B2
APPLICATION NO. : 17/765239
DATED : May 23, 2023
INVENTOR(S) : Avenido et al.

It is certified that error appears in the above-identified patent and that said Letters Patent is hereby corrected as shown below:

In the Specification

In Column 6, Line 8, delete "filler" and insert --filter-- therefor

In Column 6, Line 38, delete "filler" and insert --filter-- therefor

In Column 6, Line 58, delete "$MFC_4$" and insert --$MFC_1$-- therefor

In Column 10, Line 50, delete "(RTIC)," and insert --(RFIC),-- therefor

Signed and Sealed this
Twenty-seventh Day of August, 2024

Katherine Kelly Vidal
*Director of the United States Patent and Trademark Office*